United States Patent Office 3,466,301
Patented Sept. 9, 1969

3,466,301
PROCESS FOR OBTAINING A NITROGEN CONTAINING KETO POLYCARBOXYLIC ACID ANHYDRIDE
John H. McCracken, Pitcairn, and Johann G. D. Schulz and Arthur C. Whitaker, Pittsburgh, Pa., assignors to Gulf Research & Development Company, Pittsburgh, Pa., a corporation of Delaware
No Drawing. Original application Mar. 26 1964, Ser. No. 355,114. Divided and this application Nov. 20, 1968, Ser. No. 777,462
Int. Cl. C07d 5/32, 5/34
U.S. Cl. 260—346.4      4 Claims

ABSTRACT OF THE DISCLOSURE

A process for preparing a ketopolycarboxylic acid anhydride which involves oxidizing a 1,1-bis(3,4-dialkylphenyl)alkane with nitric acid to obtain a liquid reaction product contaning precipitated benzophenone 3,4,3',4'-tetracarboxylic acid, separating the precipitate from the reaction product and subsequently recovering the desired ketopolycarboxylic acid from the filtrate. The anhydride is used as a curing agent for epoxy resins.

This is a divisional application of our application Ser. No. 355,114 for Process, filed Mar. 26, 1964.

This invention relates to a process for preparing a keto polycarboxylic acid and the corresponding anhydride and to the acid and the corresponding anhydride themselves as new compounds and/or new compositions of matter.

Compounds that can be employed as charge to produce the acid and anhydride of this invention are 1,1-bis(3,4-dialkylphenyl)alkanes wherein the alkyl substituent has from one to five carbon atoms, preferably from one to three carbon atoms, and the alkane portion thereof has from two to five carbon atoms, preferably from two to three carbon atoms. Examples of such compounds that can be emplyed include 1,1-bis (3,4-dimethylphenyl) ethane, 1,1-bis-(3,4-dipropylphenyl) ethane, 1,1-bis (3,4-diamylphenyl) propane, 1,1-bis (3-methyl, 4-butylphenyl) pentane, 1-(3-ethyl, 4-propylphenyl), 1-(3-methyl, 4-ethylphenyl) ethane, etc. We prefer to employ di-ortho-xylylethane as charge.

The first step in the process involves subjecting the charge identified above to oxidation with nitric acid having a concentration of about five to about 70 percent. The amount of nitric acid employed, determined as the molar ratio of 100 percent nitric acid relative to the charge, is about 8.0 to about 17.0, preferably about 8.0 to about 12. The residence time required for the oxidation can be from about one minute to about 48 hours, preferably about 10 minutes to about two hours. Temperatures of about 110° to about 350° C., preferably about 150° to about 250° C., can be employed. Pressures sufficient to maintain the reaction system primarily in the liquid phase, from about atmospheric to about 500 pounds per square inch gauge or higher, are satisfactory.

Upon completion of the reaction the reaction product is permitted to cool down, preferably to room temperature, until a solid precipitate is formed. This may require, for example, from about four to about 24 hours. The crystals are separated from the liquid by any convenient method, for example, filtration. Regardless of the charge employed the crystals so obtained will be benzophenone 3,4,3',4'-tetracarboxylic acid. This is so because under the conditions described the alkyl substituents on the ring, regardless of their length, will be converted to carboxylic acid groups and the alkane portion or bridge of the charge, regardless of its length, will be converted to a bridge carbonyl.

The filtrate remaining after the benzophenone 3,4,3',4'-tetracarboxylic acid crystals have been removed therefrom contains the new keto polycarboxylic acid of this invention. The latter can be recovered from the filtrate in any convenient manner, preferably by subjecting the filtrate to evaporation conditions, that is, a temperature of about 0° to about 120° C., preferably about 20° to about 100° C., at atmospheric pressure to about two inches of mercury, preferably about eight to about two inches of mercury, for about 30 minutes to about three hours, preferably about one to about two hours. As a result of this nitric acid, water, nitrogen oxides and other volatile materials under the conditions of evaporation are driven off and a solid keto carboxylic acid is left behind. Temperatures above about 120° C. are to be avoided during the evaporation procedure; otherwise the anhydride, to be defined below, will be obtained.

In a particularly attractive embodiment, in order to obtain a purer keto carboxylic acid, the evaporation defined is carried out in two stages. In the first stage the filtrate is evaporated to remove only a portion thereof therefrom, preferably down to about one-half its original amount. Some crystals of benzophenone 3,4,3',4'-tetracarboxylic acid and trimellitic acid will precipitate out of solution as a result of this action and are removed from the filtrate in any convenient manner, for example, by filtration. The remainder of the filtrate is then heated to dryness, leaving behind the desired keto polycarboxylic acid.

In order to obtain the anhydride corresponding to the carboxylic acid defined above, the latter is merely dried, for example, at a temperature of about 120° to about 300° C., preferably about 120° to about 200° C. and a pressure of about atmospheric to about 0.1 inch of mercury for about five minutes to about 24 hours, preferably for about one to about five hours. In the event there is no desire to obtain the defined keto polycarboxylic acid but there is a wish to obtain the defined anhydride instead, the evaporation step referred to above need not be limited to a temperature of about 0° to about 120° C., as defined, but can be carried out at temperatures within the ranges defined above as being sufficient to obtain the desired anhydride.

The invention can further be illustrated by the following.

Example I

Into a 30-gallon Pfaudler glass-lined kettle there was charged 23 pounds of di-ortho-xylylethane and 10 gallons of water and the mixture was heated to a temperature of 135° C. Over a period of 4.5 hours there was pumped into the defined mixture 10 gallons of 67 percent aqueous nitric acid. For the first 1.5 hours of such addition, the temperature of the mixture was maintained at 135° C., over a period of 90 minutes the temperature was raised to 170° C. and for the remainder of the addition time the temperature was permitted to remain at the latter temperature. After nitric acid addition had been completed the mixture was kept at said latter temperature for an additional hour. The pressure during the reaction was maintained at 200 pounds per square inch gauge. The resulting product was cooled to 50° C., removed from the reactor and permitted to stand for 24 hours. Solid crystals of benzophenone 3,4,3',4'-tetracarboxylic acid in an amount of 21 pounds crystallized out of solution and was recovered therefrom by filtration.

A portion of the yellow filtrate remaining (5.8 gallons) was evaporated to approximately one-half its amount at a temperature of 50° C. and a pressure of two inches of mercury in a rotary evaporator. Solid crystals of benzophenone 3,4,3',4'-tetracarboxylic acid and trimellitic acid totaling 0.494 pound crystallized out of solution and were recovered therefrom by filtration. The residual liquid was again subjected to the same evaporation conditions until all liquid had been removed therefrom, and there was left behind 1.15 pounds of a yellow solid identified as a nitrogen-containing keto polycarboxylic acid by the following tests. Infrared analysis disclosed the presence of absorption bands characteristic for aromatic keto carbonyl as well as acid carbonyl. Its molecular weight was found to be 400, which is in accord with a two-ring structure, its neutral equivalent as 94.0, and its melting point 120° to 140° C. The compound was esterified with methanol to obtain the corresponding methyl ester, which was characterized by its infrared spectrum and its insolubility in water. This contrasts sharply with the nitrogen-containing keto polycarboxylic acid which is extremely soluble in water. The keto polycarboxylic acid was also found to be soluble in ketones and alcohols, such as acetone, methyl isobutyl ketone, methanol, propanol, glycol, etc. Elementary analysis showed the presence of 50.15 percent by weight of carbon, 2.84 percent by weight of hydrogen, 1.35 percent by weight of nitrogen and 45.66 percent by weight of oxygen (the latter by different).

The nitrogen-containing keto polycarboxylic acid was heated to 150° C. at a pressure of two inches of mercury for two hours. As a result of this, the acid lost water, forming a derivative which by the appearance of anhydride carbonyl bands in its infrared spectrum and disappearance of the acid bands proved to be an anhydride. The new anhydride is a yellow solid having a melting point of 110° to 120° C. and a molecular weight of 315 and a neutral equivalent of 88.5. Elementary analysis of the anhydride showed the presence of 55.70 percent by weight of carbon, 2.28 percent by weight of hydrogen, 1.4 percent by weight of nitrogen and 40.62 percent by weight of oxygen (the latter by difference). The new anhydride was dissolved in water and was found to transform itself to the acid from which it was obtained.

As noted the new nitrogen-containing keto polycarboxylic acid can be converted to the corresponding anhydride merely by drying the same. The new anhydride can easily be incorporated into epoxy resins and employed as curing agents therefor to produce a resin having a heat distortion temperature and a high Barcol hardness. This is shown below in Example II.

Example II

Into a 100 cc. glass-lined reactor there was placed 20 grams of Epon 828, an epoxy resin manufactured by Shell Chemical Company, New York, N.Y. The resin was heated to 100° C. and to it there was added 5.47 grams of the new anhydride produced above and 5.0 grams of maleic anhydride. The mixture was cured at 200° C. for 24 hours. A heat distortion temperature of 218° C. and a Barcol hardness of 43 were obtained for the cured resin. Maleic anhydride is often employed to facilitate incorporation of an organic anhydride into an epoxy resin. Although our new anhydride is highly compatible with the epoxy resin employed herein, and therefore does not require the assistance of maleic anhydride, maleic anhydride was nevertheless employed so that the cured resin obtained herein could be compared with the same epoxy resin containing anhydrides that require the presence of maleic anhydride to facilitate their incorporation into the epoxy resin. The incorporation of maleic anhydride alone in the same total amount as the two anhydrides employed above would result in a cured resin having a lower heat distortion temperature and lower Barcol hardness.

The preparation of the new nitrogen-containing keto polycarboxylic acids is further illustrated below in Examples III and IV.

Example III

Into a one-liter stainless steel autoclave there was charged 59.3 grams of di-ortho-xylylethane and 250.0 grams of water and the contents thereof were heated to 150° C. Over a period of 4.0 hours there was added to the autoclave 510 grams of 70 percent aqueous nitric acid. During the addition and for 2.5 hours thereafter the temperature in the autoclave was maintained at 150° C. and the pressure at 200 pounds per square inch gauge. The product resulting from the reaction was worked up as in Example I and there was recovered 62.1 grams of benzophenone 3,4,3',4'-tetracarboxylic acid, one gram of trimellitic acid and 21.5 grams of the nitrogen-containing keto carboxylic acid of this invention.

Example IV

Into a one-liter stainless steel autoclave there was charged 59.0 grams of di-ortho-xylylethane and 430.0 grams of water and the contents thereof were heated at 140° C. Over a period of two hours there was introduced into the autoclave 160.0 grams of 70 percent aqueous nitric acid while the temperature was maintained at 140° C. Over the course of the next hour there was added an additional 160 grams of 70 percent aqueous nitric acid to the autoclave while the temperature was gradually permitted to climb to 170° C. The contents of the reactor were maintained for an additional two hours at the latter temperature after completion of the addition of nitric acid thereto. The contents of the reactor were permitted to cool to room temperature, withdrawn therefrom and allowed to stand for 24 hours, after which time 55.8 grams of benzophenone 3,4,3',4'-tetracarboxylic acid came out of solution and was removed therefrom by filtration. Partial evaporation of the filtrate at a temperature of 50° C. and a pressure of two inches of mercury for two hours precipitated five grams of trimellitic acid, which was identified by its infrared spectrum and its neutral equivalent of 70.6. Total evaporation of the filtrate, after removal of trimellitic acid therefrom, under the same conditions over a period of two hours yielded 23 grams of the nitrogen-containing keto polycarboxylic acid of this invention. Its neutral equivalent was found to be 92.3.

We claim:

1. A process for preparing a keto polycarboxylic acid anhydride which comprises oxidizing di-ortho-xylylethane with nitric acid having a concentration of about five to about seventy percent at a temperature of about 110° to about 350° C. to obtain a liquid reaction product, cooling said reaction product to precipitate substantially all of the benzophenone 3,4,3',4'-tetracarboxylic acid produced during said reaction, separating said precipitate from said reaction product, subjecting the filtrate so obtained to evaporation to remove nitric acid and water therefrom, thereby leaving behind keto polycarboxylic acid, and thereafter subjecting said keto polycarboxylic acid to a temperature of about 120° to about 300° C. for a time sufficient to convert the same to the corresponding anhydride.

2. The process of claim 1 wherein said evaporation is conducted at a temperature of about 0° to about 120° C.

3. The process of claim 1 wherein said evaporation is conducted in two stages, in the first of which about one-half of said filtrate is removed therefrom and any trimellitic acid and benzophenone 3,4,3',4'-tetracarboxylic acid that are present are precipitated and also removed therefrom, and in the second of which the evaporation is completed, thereby leaving behind the desired keto polycarboxylic acid.

4. The keto polycarboxylic acid anhydride resulting from the process of claim 1.

References Cited

UNITED STATES PATENTS 3,075,007  1/1963  McCracken et al. ___ 260—346.4

ALEX MAZEL, Primary Examiner

BERNARD I. DENTZ, Assistant Examiner

U.S. Cl. X.R.

260—2